United States Patent
Stacy et al.

(10) Patent No.: US 7,472,509 B1
(45) Date of Patent: Jan. 6, 2009

(54) NON-SEPARABLE TWO-PIECE FISHING ROD

(76) Inventors: Emmett E. Stacy, 9626 Kilrenny, Spring, TX (US) 77379; Ella R. Stacy, 9626 Kilrenny, Spring, TX (US) 77379

(*) Notice: Subject to any disclaimer, the term of this patent is extended or adjusted under 35 U.S.C. 154(b) by 127 days.

(21) Appl. No.: 11/709,245

(22) Filed: Feb. 22, 2007

Related U.S. Application Data

(63) Continuation-in-part of application No. 10/906,278, filed on Feb. 11, 2005, now abandoned.

(51) Int. Cl.
*A01K 87/00* (2006.01)
(52) U.S. Cl. ............... 43/18.1 R; 43/18.1 CT
(58) Field of Classification Search .......... 43/18.1 R, 43/18.1 CT, 18.5
See application file for complete search history.

(56) References Cited

U.S. PATENT DOCUMENTS

| | | | | |
|---|---|---|---|---|
| 10,795 | A | | 4/1854 | De Saxe |
| 279,988 | A | * | 6/1883 | Smith ................ 43/18.1 R |
| 303,474 | A | * | 8/1884 | Webb ................ 403/349 |
| 2,478,131 | A | * | 8/1949 | Rossi ................ 43/18.1 R |
| 2,742,728 | A | | 4/1956 | Boyd |
| 2,822,896 | A | * | 2/1958 | Schuster ................ 52/108 |
| 3,036,398 | A | | 5/1962 | Gagner |
| 3,150,460 | A | | 9/1964 | Dees |
| 3,245,169 | A | * | 4/1966 | Kennel ................ 43/18.1 CT |
| 3,279,116 | A | | 10/1966 | Chapman |
| 3,570,164 | A | * | 3/1971 | Tozier ................ 43/18.1 R |
| 4,024,666 | A | * | 5/1977 | Carver ................ 43/18.1 R |
| 4,063,830 | A | | 12/1977 | Ban |
| 4,160,607 | A | * | 7/1979 | Reichow ................ 403/286 |
| 4,738,046 | A | * | 4/1988 | Fraylick et al. ........ 43/18.1 R |
| 4,800,668 | A | * | 1/1989 | Burrough ................ 43/18.1 R |
| 5,195,267 | A | * | 3/1993 | Daniels ................ 43/18.1 R |

* cited by examiner

*Primary Examiner*—Kurt Rowan
(74) *Attorney, Agent, or Firm*—Donald R. Schoonover

(57) ABSTRACT

A non-separable two-piece fishing rod includes a first rod section; a second rod section structured to matingly join the first rod section in an end-to-end engaged configuration; and a retention member having a first member end secured to the first rod section and a second member end secured to the second rod section, the retention member being constructed of flexible resilient material and being structured and dimensioned to create a longitudinal force between the first and second rod sections; the retention member being structured wherein the force created by the retention member between the first and second rod sections prevents the first rod section from separating from the second rod section in a casting operation. The fishing rod includes a latching mechanism, a latched indicating mechanism, a slowed connecting mechanism, and gripping means.

9 Claims, 1 Drawing Sheet

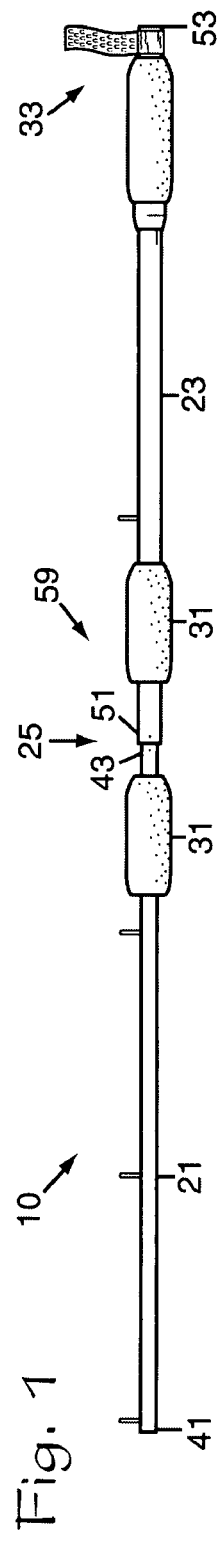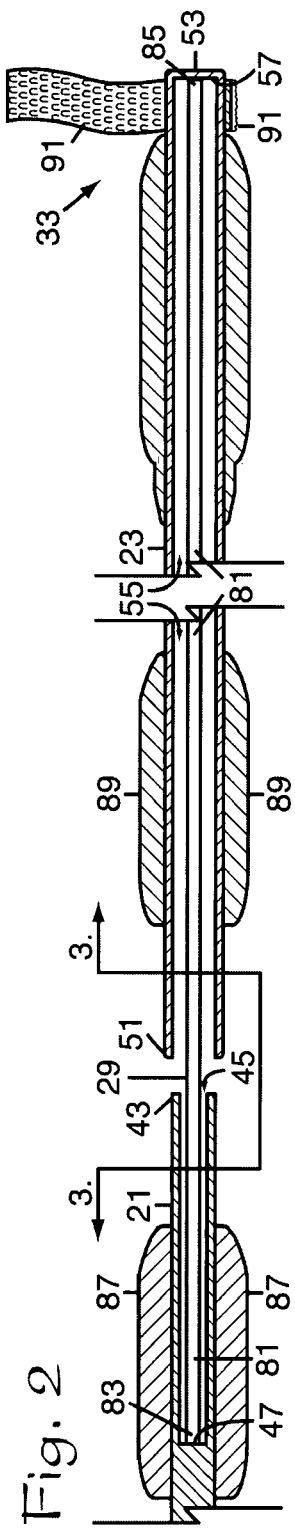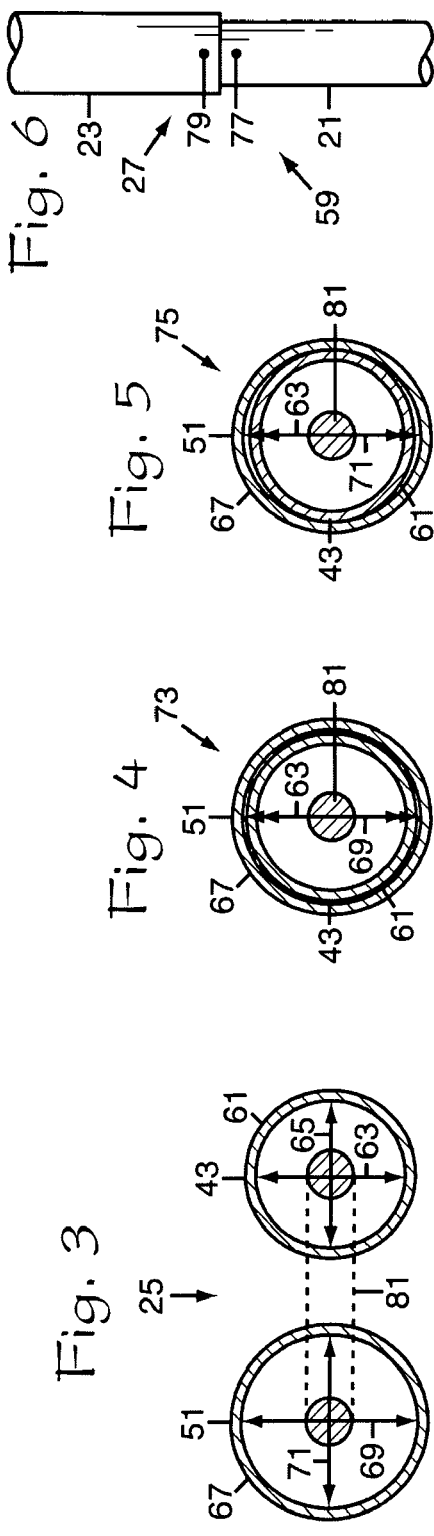

NON-SEPARABLE TWO-PIECE FISHING ROD

CROSS-REFERENCE TO RELATED APPLICATIONS

This application is a continuation-in-part of application Ser. No. 10/906,278 filed Feb. 11, 2005, now abandoned.

BACKGROUND OF THE INVENTION

1. Field of the Invention

The present invention relates to sporting goods and, more specifically without limitation, to fishing rods.

2. Discussion of the Related Art

At the center of every fisherman's equipment is a fishing rod. Currently, there is a wide range of designs of fishing rods on the market. Variations in size of the fishing rod, its weight and composition, color and design, and other factors cause numerous products to be readily available. Many fishing rods have a two-piece design, enabling those rods to be taken apart for transportation and storage. More specifically, a two-piece fishing rod generally includes two sections wherein a cylindrically-shaped end of one of those sections is telescopically insertable within a cylindrically-shaped hollow end of the other one of those sections to thereby join the two sections together in an end-to-end relationship. Generally, the only means for retaining the two sections in the end-to-end relationship is frictional forces between the two telescopically-engaged cylindrically-shaped ends of the two sections. Unfortunately, this features can be a problem as the two sections of the fishing rod may unexpectedly separate during a casting operation, sometimes causing loss of the forward section of the two-piece fishing rod.

What is needed is a two-piece fishing rod having means for preventing the forward section of the fishing rod from being separated from the rearward section of the fishing rod during a casting operation.

SUMMARY OF THE INVENTION

The improvements of the present invention for a non-separable fishing rod include a first rod section, a second rod section, a latching mechanism, an indicating mechanism, a retention member, gripping means, and a connecting mechanism.

The first rod section includes a first distal end, a first proximal end, and a first internal cavity with a first cavity end, wherein the first cavity extends from the first cavity end to and through the first proximal end.

The second rod section includes a second distal end, a second proximal end, and a second internal cavity with a second cavity end, wherein the second cavity extends substantially through the second rod section from the second cavity end to and through the second distal end. The first proximal end and the second distal end are structured to slidingly and telescopingly mate to join the first and second rod sections together in an end-to-end engaged configuration.

The latching mechanism is structured to releasably latch the first proximal end of the first rod section to the second distal end of the second rod section in the engaged configuration. The latching mechanism includes a first latch portion wherein the first proximal end is oval-shaped and has a first major axis and a first minor axis, and a second latch portion wherein the second distal end is also oval-shaped and has a second major axis and a second minor axis. The first proximal end and the second distal end are minimally flexible with the first and second sections, when mated with each other, being axially rotatable to and from an unlatched configuration, whereat the first major axis is aligned with the second major axis, and a latched configuration whereat the first major axis is aligned with the second minor axis.

The indicating mechanism is structured to indicate when the first and second rod sections, when mated, have been rotated to the latched configuration.

The retention member includes a first member end secured to the first cavity and a second member end secured to the second cavity end. The retention member is constructed of flexible resilient material and is structured and dimensioned to create a force between the first and second rod sections even when the first and second rod sections are matingly engaged.

The gripping means includes a first grip secured to the first rod section near the first proximal end thereof and a second grip secured to the second rod section near the second distal end thereof. The gripping means is structured to assist a user in displacing the first and second rod sections to and from the latched and unlatched configurations and in overcoming the force created by the retention member between the first and second rod sections when the first rod section is being disengaged from the second rod section.

The connecting mechanism is structured to releasably secure the first distal end of the first rod section to the second proximal end of the second rod section when the first proximal end is disengaged from the second distal end.

The latching mechanism and the retention member are structured wherein the frictional forces created by the latching mechanism in combination with the force created by the retention member between the first and second rod sections prevent the first rod section from separating from the second rod section in a casting operation.

PRINCIPAL OBJECTS AND ADVANTAGES OF THE INVENTION

The principal objects and advantages of the present invention include: providing a two-piece fishing rod having means for preventing the forward section of the fishing rod from being separated from the rearward section of the fishing rod during a casting operation; and generally providing such a two-piece fishing rod that is reliable in performance, capable of long lasting life, and particularly well adapted for the proposed usages thereof.

Other objects and advantages of this invention will become apparent from the following description taken in conjunction with the accompanying drawings wherein are set forth, by way of illustration and example, certain embodiments of this invention.

BRIEF DESCRIPTION OF THE DRAWINGS

FIG. 1 is a side-elevational view of a non-separable two-piece fishing rod, according to the present invention.

FIG. 2 is an enlarged, fragmentary and schematic side-elevational view of the non-separable two-piece fishing rod.

FIG. 3 is an enlarged, schematic and cross-sectional view of the non-separable two-piece fishing rod taken along line 3-3 of FIG. 2.

FIG. 4 is an enlarged, schematic and cross-sectional view similar to FIG. 3 but showing the non-separable two-piece fishing rod is an unlatched configuration.

FIG. 5 is an enlarged, schematic and cross-sectional view similar to FIG. 4 but showing the non-separable two-piece fishing rod in a latched configuration.

FIG. 6 is a plan view of the non-separable two-piece fishing rod showing an indicating mechanism thereof, according to the present invention.

DETAILED DESCRIPTION OF THE INVENTION

As required, embodiments of the present invention are disclosed herein, however, it is to be understood that the disclosed embodiments are merely exemplary of the invention, which may be embodied in various forms. Therefore, specific structural and functional details disclosed herein are not to be interpreted as limiting, but merely as a basis for claims and as a representative basis for teaching one skilled in the art to variously employ the present invention in virtually any appropriately detailed structure.

The reference numeral 10 generally refers to a non-separable two-piece fishing rod in accordance with the present invention, as shown in the FIGS. 1 through 6. The fishing rod 10 includes a first rod section 21, a second rod section 23, a latching mechanism 25, an indicating mechanism 27, a retention member 29, gripping means 31, and a connecting mechanism 33.

The first rod section 21 includes a first distal end 41, a first proximal end 43, and a first internal cavity 45 with a first cavity end 47 wherein the first cavity 45 extends from the first cavity end 47 to and through the first proximal end 43.

The second rod section 23 includes a second distal end 51, a second proximal end 53, and a second internal cavity 55 with a second cavity end 57 wherein the second cavity 55 extends substantially through the second rod section 23 from the second cavity end 57 to and through the second distal end 51. The second distal end 51 is structured and dimensioned to slidingly and telescopingly mate with the first proximal end 43 to thereby form an end-to-end engaged configuration 59, as shown in FIG. 1.

The latching mechanism 25 is structured to frictionally and releasably latch the first proximal end 43 to the second distal end 51 in the engaged configuration 59. The latching mechanism 25 includes a first latch portion 61, wherein the first proximal end 43 is oval-shaped and has a first major axis 63 and a first minor axis 65, and a second latch portion 67, wherein the second distal end 51 is oval-shaped and has a second major axis 69 and a second minor axis 71, as shown in FIG. 3. The first proximal end 43 and the second distal end 51 are minimally flexible wherein the first and second rod sections 21, 23, when mated with each other, are axially rotatable relative to each other to and from an unlatched configuration 73, whereat the first major axis 63 is aligned with the second major axis 69 as illustrated in FIG. 4, and a latched configuration 75, whereat the first major axis 63 is aligned with the second minor axis 71 as illustrated in FIG. 5.

The indicating mechanism 27 is structured to indicate when the first and second rod sections 21, 23 have been rotated relative to each other to the latched configuration 75. For example, the indicating mechanism 27 may include two dot-like indicia 77, 79 that are axially spaced adjacently to each other when the first and second rod sections 21, 23 have been mated and rotated to the latched configuration 75, as shown in FIG. 6.

The retention member 29 includes a flexible resilient elongate member 81 having a first member end 83 secured to the first cavity end 47 and a second member end 85 secured to the second cavity end 57, as schematically shown in FIG. 2. The resilient member 81 is structured and dimensioned to continually apply a force between the first and second rod sections 21, 23, somewhat like a bungee cord, even when the first and second rod sections 21, 23 are matingly engaged in the engaged configuration 59. The resilient member 81 is structured and dimensioned wherein it is contained within the first and second cavities 45, 55 in its entirely when the first and second rod sections 21, 23 are in the engaged configuration 59.

The griping means 31 includes a first grip 87 secured to the first rod section 21 near the first proximal end 43 and a second grip 89 secured to the second rod section 23 near the second distal end 51. The gripping means 31 is structured to assist a user to displace the first and second rod sections 21, 23 to and from the latched and unlatched configurations 75, 73 and to assist a user to overcome the force created by the retention member 29 between the first and second rod sections 21, 23 when disengaging the first rod section 21 from the second rod section 23 as hereinafter described.

The connecting mechanism 33, such as a hook and loop fastener mechanism 91 for example, is structured to releasably secure the first distal end 41 to the second proximal end 53 when the first proximal end 43 is disengaged from the second distal end 51. Preferably, the lengths of the first and second rod sections 21, 23 are approximately equal so the first and second rod sections 21, 23 can be compactly and conveniently stowed in a side-by-side relationship with the resilient member 81 retaining the first proximal end 43 in close proximity to the second distal end 51 and the connecting mechanism 33 retaining the first distal end 41 in close proximity to the second proximal end 53.

In an application of the present invention, a user prepares the two-piece fishing rod 10 for use by releasing the first distal end 41 from the connecting mechanism 33 and rotating the first rode section 21 so it aligns endwise with the second rod section 23, whereupon the force applied by the resilient member 81 pulls the first proximal end 43 into mating engagement with the second distal end 51. The user then grasps the first and second grips 87, 90 and twists the first and second rod sections 21, 23 relative to each other so the first major axis 63 is aligned with the second minor axis 71, as indicated by the axial alignment of the two dots 77, 79 of the indicating mechanism 27. As a result, frictional forces created by the latching mechanism 25 in combination with the force created by the retention member 29 operatively prevent the first rod section 21 from separating from the second rod section 23 in a casting operation.

It is to be understood that while certain forms of the present invention have been illustrated and described herein, it is not to be limited to the specific forms or arrangement of parts as described and shown.

What is needed and desired to be covered by Letters Patent is as follows:

1. A two-piece fishing rod, comprising:
   (a) a first rod section having a first distal end, a first proximal end, and a first internal cavity with a first cavity end, the first cavity extending to and through the first proximal end;
   (b) a second rod section having a second distal end, a second proximal end, and a second internal cavity with a second cavity end, the second cavity extending substantially through the second rod section including to and through the second distal end, wherein the first proximal end and the second distal end are structured to slidingly and telescopingly mate to join the first and second rod sections together in an end-to-end engaged configuration;
   (c) a latching mechanism structured to releasably latch the first proximal end to the second distal end in the engaged configuration, the latching mechanism including:

(1) a first latch portion wherein the first proximal end is oval-shaped and has a first major axis and a first minor axis, and
(2) a second latch portion wherein the second distal end is oval-shaped and has a second major axis and a second minor axis, and
(3) wherein the first proximal end and the second distal end being minimally flexible with the first and second sections, when mated with each other, being axially rotatable to and from:
(A) a latched configuration whereat the first major axis is aligned with the second minor axis, and
(B) an unlatched configuration whereat the first major axis is aligned with the second major axis;
(d) an indicating mechanism structured to indicate when the first and second rod sections, when mated, have been rotated to the latched configuration;
(e) a retention member having a first member end secured to the first cavity end and a second member end secured to the second cavity end, the retention member being constructed of flexible resilient material and being structured and dimensioned to create a force between the first and second rod sections even when the first and second rod sections are matingly engaged;
(f) gripping means including a first grip secured to the first rod section near the first proximal end thereof and a second grip secured to the second rod section near the second distal end thereof, the gripping means being structured to assist a user to displace the first and second rod sections to and from the latched and unlatched configurations and to overcome the force created by the retention member between the first and second rod sections when disengaging the first rod section from the second rod section; and
(g) a connecting mechanism structured to releasably secure the first distal end to the second proximal end when the first proximal end is disengaged from the second distal end; and
(h) the latching mechanism and the retention member are structured wherein the frictional forces created by the latching mechanism in combination with the force created by the retention member between the first and second rod sections prevent the first rod section from separating from the second rod section in a casting operation.

2. A two-piece fishing rod, comprising:
(a) a first rod section including a first distal end, a first proximal end, and a first internal cavity with a first cavity end, the first cavity extending from the first cavity end to and through the first proximal end;
(b) a second rod section including a second distal end, a second proximal end, and a second internal cavity with a second cavity end, the second cavity extending substantially through the second rod section from the second cavity end to and through the second distal end, wherein the first proximal end and the second distal end are structured to slidingly and telescopingly mate to join the first and second rod sections together in an end-to-end engaged configuration, the second rod section structured to matingly join the first rod section in an end-to-end engaged configuration; and
(c) a retention member having a first member end secured to the first cavity end of the first rod section and a second member end secured to the second cavity end of the second rod section, the retention member being constructed of flexible resilient material and being structured and dimensioned to create a force between the first and second rod sections; the retention member being structured wherein the force created by the retention member between the first and second rod sections prevents the first rod section from separating from the second rod section in a casting operation.

3. A two-piece fishing rod as described in claim 2, wherein the resilient member is structured and dimensioned wherein it is contained within the first and second cavities in its entirety when the first and second rod sections are in the engaged configuration.

4. A two-piece fishing rod as described in claim 2, further comprising:
(a) a latching mechanism structured to releasably latch the first proximal end of the first rod section to the second distal end of the second rod section in the engaged configuration, the latching mechanism including:
(1) a first latch portion wherein the first proximal end is oval-shaped and has a first major axis and a first minor axis, and
(2) a second latch portion wherein the second distal end is oval-shaped and has a second major axis and a second minor axis, and
(3) the first proximal end and the second distal end being minimally flexible with the first and second sections, when mated with each other, being axially rotatable to and from:
(A) an unlatched configuration whereat the first major axis is aligned with the second major axis, and
(B) a latched configuration whereat the first major axis is aligned with the second minor axis; and
(b) the latching mechanism and the retention member being structured wherein the frictional forces created by the latching mechanism in combination with the force created by the retention member between the first and second rod sections prevent the first rod section from separating from the second rod section in a casting operation.

5. A two-piece fishing rod as described in claim 4, further comprising an indicating mechanism structured to indicate when the first and second rod sections, when mated, have been rotated to the latched configuration.

6. A two-piece fishing rod as described in claim 5, wherein the indicating mechanism includes two dots that are axially alignable to indicate when the first and second rod sections are in the latched configuration.

7. A two-piece fishing rod as described in claim 4, further comprising gripping means including a first grip secured to the first rod section near the first proximal end thereof and a second grip secured to the second rod section near the second distal end thereof, the gripping means being structured to assist a user to displace the first and second rod sections to and from the latched and unlatched configurations and to overcome the force created by the retention member between the first and second rod sections when disengaging the first rod section from the second rod section.

8. A two-piece fishing rod as described in claim 2, further comprising a connecting mechanism structured to releasably secure the first distal end of the first rod section to the second proximal end of the second rod section when the first proximal end is disengaged from the second distal end.

9. A two-piece fishing rod as described in claim 8, wherein the connecting mechanism includes a hook-and-loop fastener secured to the second proximal end of the second rod section.

* * * * *